US007085933B2

(12) United States Patent
Challener et al.

(10) Patent No.: US 7,085,933 B2
(45) Date of Patent: Aug. 1, 2006

(54) COMPUTER SYSTEM APPARATUS AND METHOD FOR IMPROVED ASSURANCE OF AUTHENTICATION

(75) Inventors: David Carroll Challener, Raleigh, NC (US); David Robert Safford, Brewster, NY (US); Leendert Peter Van Doorn, Valhalla, NY (US)

(73) Assignee: Lenvo (Singapore) Pte, Ltd. (SG)

( * ) Notice: Subject to any disclaimer, the term of this patent is extended or adjusted under 35 U.S.C. 154(b) by 829 days.

(21) Appl. No.: 10/166,835

(22) Filed: Jun. 11, 2002

(65) Prior Publication Data

US 2003/0229802 A1 Dec. 11, 2003

(51) Int. Cl.
*H04L 9/00* (2006.01)
(52) U.S. Cl. ...................................... 713/182; 713/193
(58) Field of Classification Search ................ 713/182, 713/193, 200, 201
See application file for complete search history.

(56) References Cited

U.S. PATENT DOCUMENTS

| 4,885,789 | A |   | 12/1989 | Burger et al. ................. 380/25 |
| 4,918,653 | A |   | 4/1990  | Johri et al. .................. 364/900 |
| 4,945,468 | A |   | 7/1990  | Carson et al. ............... 364/200 |
| 5,201,000 | A |   | 4/1993  | Matyas et al. ................ 380/30 |
| 5,404,525 | A | * | 4/1995  | Endicott et al. ............ 717/108 |
| 5,502,766 | A |   | 3/1996  | Boebert et al. ................ 380/25 |
| 5,596,718 | A |   | 1/1997  | Boebert et al. ........ 395/187.01 |
| 5,701,342 | A |   | 12/1997 | Anderson et al. .............. 380/4 |
| 5,721,908 | A | * | 2/1998  | Lagarde et al. ............... 707/10 |
| 5,740,441 | A | * | 4/1998  | Yellin et al. ................. 717/134 |
| 5,822,435 | A |   | 10/1998 | Boebert et al. ............... 380/49 |
| 5,841,871 | A |   | 11/1998 | Pinkas ......................... 380/25 |
| 5,890,133 | A | * | 3/1999  | Ernst .............................. 705/7 |
| 5,970,242 | A | * | 10/1999 | O'Connor et al. .......... 717/100 |
| 6,092,147 | A |   | 7/2000  | Levy et al. .................... 711/6 |
| 6,233,685 | B1 |  | 5/2001  | Smith et al. ................. 713/194 |
| 6,314,520 | B1 |  | 11/2001 | Schell et al. ................ 713/200 |
| 6,332,163 | B1 | * | 12/2001 | Bowman-Amuah ......... 709/231 |

* cited by examiner

*Primary Examiner*—Thomas R. Peeso
(74) *Attorney, Agent, or Firm*—William N. Hogg; Driggs, Hogg & Fry Co., LPA

(57) ABSTRACT

A computer system, method of operation, and program product which gives a clear indication to a user when a computer system has transitioned to a trusted state.

12 Claims, 3 Drawing Sheets

COMPUTER SYSTEM APPARATUS AND METHOD FOR IMPROVED ASSURANCE OF AUTHENTICATION

BACKGROUND OF THE INVENTION

Concern over the security and authenticity of transactions through and over computer systems has become a growing concern as the use of computer systems has proliferated. That concern has given rise to the Trusted Computing Platform Alliance, also know as the TCPA. The Design Philosophies statement of the TCPA states that the purpose of the activity is to encourage the use of computer platforms for critical purposes by improving the basis on which a computing environment may be trusted.

The TCPA has developed a specification in addition to the Design Philosophy statement, and included in their materials a glossary of terminology used in their discussions. Certain terms appearing hereinafter may be found in that glossary as well as having meaning apart from the glossary definitions offered by the TCPA. While it is intended that the glossary definitions will be helpful, it is to be recognized at the outset of the discussion which follows that those definitions are deemed illustrative only and not fully binding on the terminology used. The choice of TCPA defined terms is made only for convenience and as an aid to understanding, avoiding restriction to those definitions as the meaning of the terminology is expected to expand as the technology becomes into wider use.

A Trusted Platform is a platform that can be trusted by local users and by remote entities. TCPA uses a behavioral definition of trust: an entity can be trusted if it always behaves in the expected manner for the intended purpose. The basis for trusting a platform, or computer system, is a declaration by a known authority that a platform with a given identity can be trusted to measure and report the way it is operating.

One possibility for a trusted platform is the authentication by a user of a file or document generated at the platform or system and passed, supplied or delivered to another platform or system. Such transfer of a file or document may be by any of the known channels or forms of communicating data. When a user desires to give assurance that the data being transferred has been originated by that user, a process of authentication is initiated. That is, some "signature" or authenticating data is supplied which gives the appropriate assurance to a recipient as to the "trustability" of the origin of the data.

As will be understood, it is of importance that such signature be maintained as trustworthy. For that purpose, various forms of attack on the trusted capabilities for such a signature should be anticipated. The present invention deals with one such form of attack.

It is somewhat conventional for protection of authentication capabilities to be achieved by use of passwords or passphrases. Computer system users are likely familiar with such capabilities as power-on, hard drive and network passwords, as well as passwords for access to secured internet sites. An authenticating signature capability is similarly protected.

However, attacks may become focused on necessary transition points in the use of computer systems. For example, a user may wish to create a file or document while the system is in a insecure state, and then later provide that file or document in a trusted form. In order to arrive at the trusted form, the user must reach and apply the TCPA functions which establish the trustworthiness of the system, and then supply the signature. The transition from the insecure to the trusted states may present a conceivable avenue of attack for a person wishing to subvert the trusted nature of the system. For example, a "spoofing" program may be executed which would cause the user to believe that the system is in trusted stated while it is in fact in an insecure state. Such operation may expose the system to capture of passwords or passphrases for nefarious purposes, or to the inadvertent and unknowing attachment of the signature to files or documents which the user would never intend to so authenticate.

SUMMARY OF THE INVENTION

In order to avoid the likelihood of inadvertent disclosure or attachment of an authenticating data string, what is described hereinafter is a computer system, method of operation, and program product which gives a clear indication to a user when a computer system has transitioned to a trusted state.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
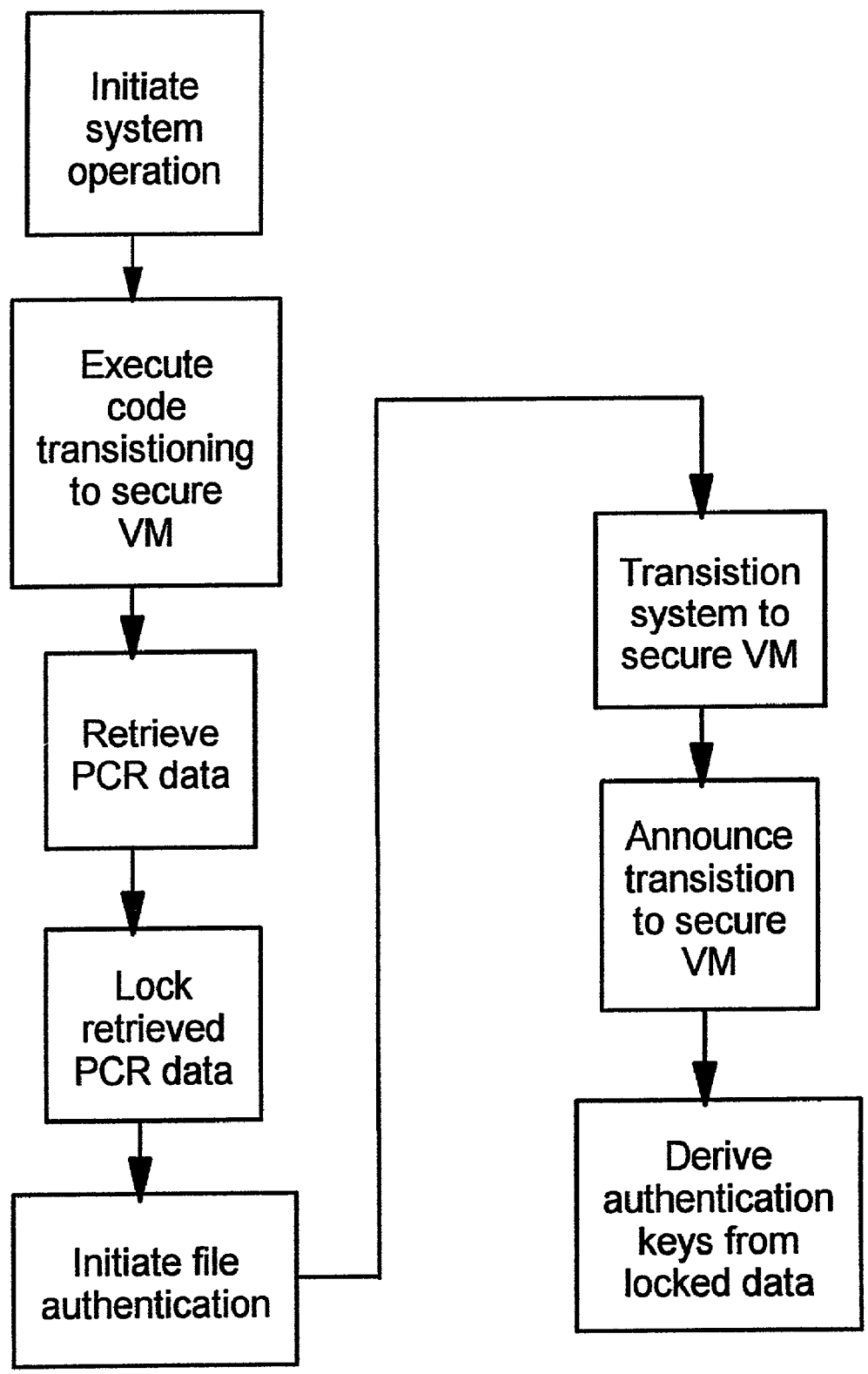
FIG. 1 is a schematic illustration of the steps of a method in accordance with this invention.

Referring now to FIG. 1, an illustration is there given of the steps in operation of a computer system which has trusted computing platform capabilities, including the presence of a Trusted Platform Module (TPM) and Platform Configuration Register (PCR), along with conventional peripherals such as a display and data entry device such as a keyboard. Such a system itself is illustrated in another Figure and will be more fully described hereinafter.

In accordance with this invention, powering up of the computer system, as is conventional, initiates system operation. The system executes code, commonly known as boot code, which is stored accessibly to the system, and goes through sequences well known to persons of skill in the applicable arts to bring the system into useful operation.

In accordance with this invention, the system is first brought into a state which constitutes a secure virtual machine, in the trusted state. While in this initial trusted state, the code executing on the system causes retrieval of data strings stored in a platform configuration register and related to a password or passphrase selected by a qualified user of the system and to a randomly generated string enabling use of defined keys on the Trusted Platform Module. The last mentioned data may be an xor of the hash of a passphrase and random authorization data created to be used as authorization data by a particular key. The random data is to be maintained in DRAM memory, withheld from caching to disk and from exposure by the secure virtual machine.

The random nature of the authorization data for a key keeps the key from being guessed or "tricked" out of the user of the machine, as it is unknown to the user.

At a subsequent time, a user of the system will wish to authenticate by "signature" a data file or document, in order that its origin can become trusted in the sense that term is here used. The document or data file will likely have been generated in an application accessible while the system is in an insecure state. Providing the authenticating signature is a function of the system when in a secure state. Thus programing will respond to a user initiating authentication by transitioning the computer system to a secure state. When authentication is requested, entry of the system into the secure state is announced to the user in some way that assures the user that the state has been properly entered, and the data necessary to implement the keys for authentication is made available for access.

Announcement of entry into the secure, authorization enabling, state is announced to the user in a selected one of several ways. A first way is to drive a display associated with the computer system to present a distinctive display, such as a pattern, color, text, or combination of such elements, which is distinctive from other windows displayed, thereby enabling the user to visually perceive that the secure state has been entered. A second way is to selectively energize or illuminate indicators already present on the keyboard associated with the system, such as the indicators for "Num Lock" or "Caps Lock" or "Scroll Lock", either alone or in a defined pattern or with defined characteristics such as a quick or slow flash. A third way is to provide a specific indicator or annunciator for the dedicated purpose of indicating a secure machine state. Persons skilled in the applicable arts will be able from these suggestions to derive other forms of announcement, including those which may use other senses than visual, such as auditory or tactile. The significant characteristic is that the user is advised in a distinctive way that the system, in response to a decision to authenticate, has properly entered the state to do so in a trusted manner.

Regardless of the form of announcement, the display may include all or a part of the document or data file being signed, so that the user is also advised that the file being authenticated is the desired file for such authentication.

Following the procedures here described, even a spoofing program intended to grant the appearance of the announcement will fail of authentication or derivation of the necessary data to utilize a key, as the locked data will be and remain inaccessible under such circumstances.

Figure 2:
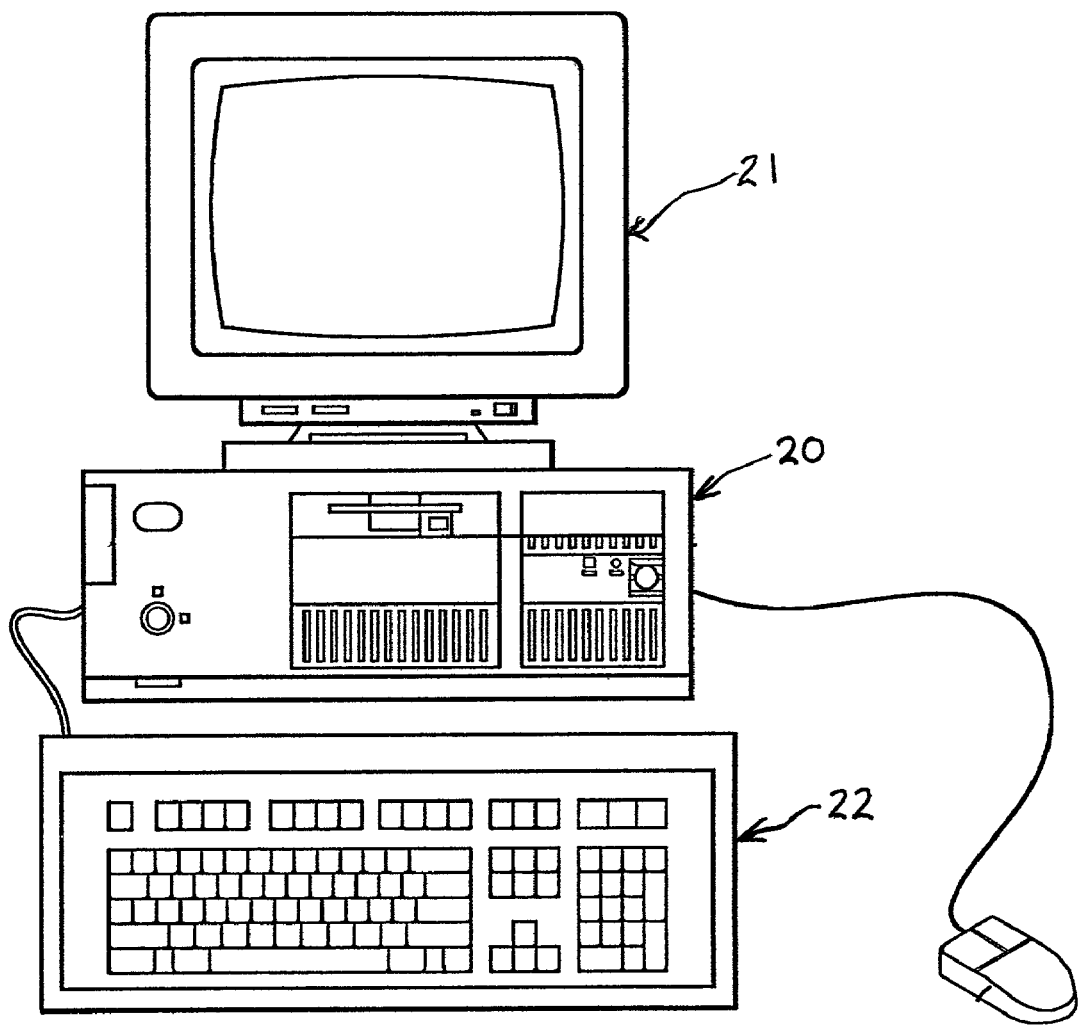
FIG. 2 is an illustration of a computer system with which the method of FIG. 1 may be exercised.
Figure 3:
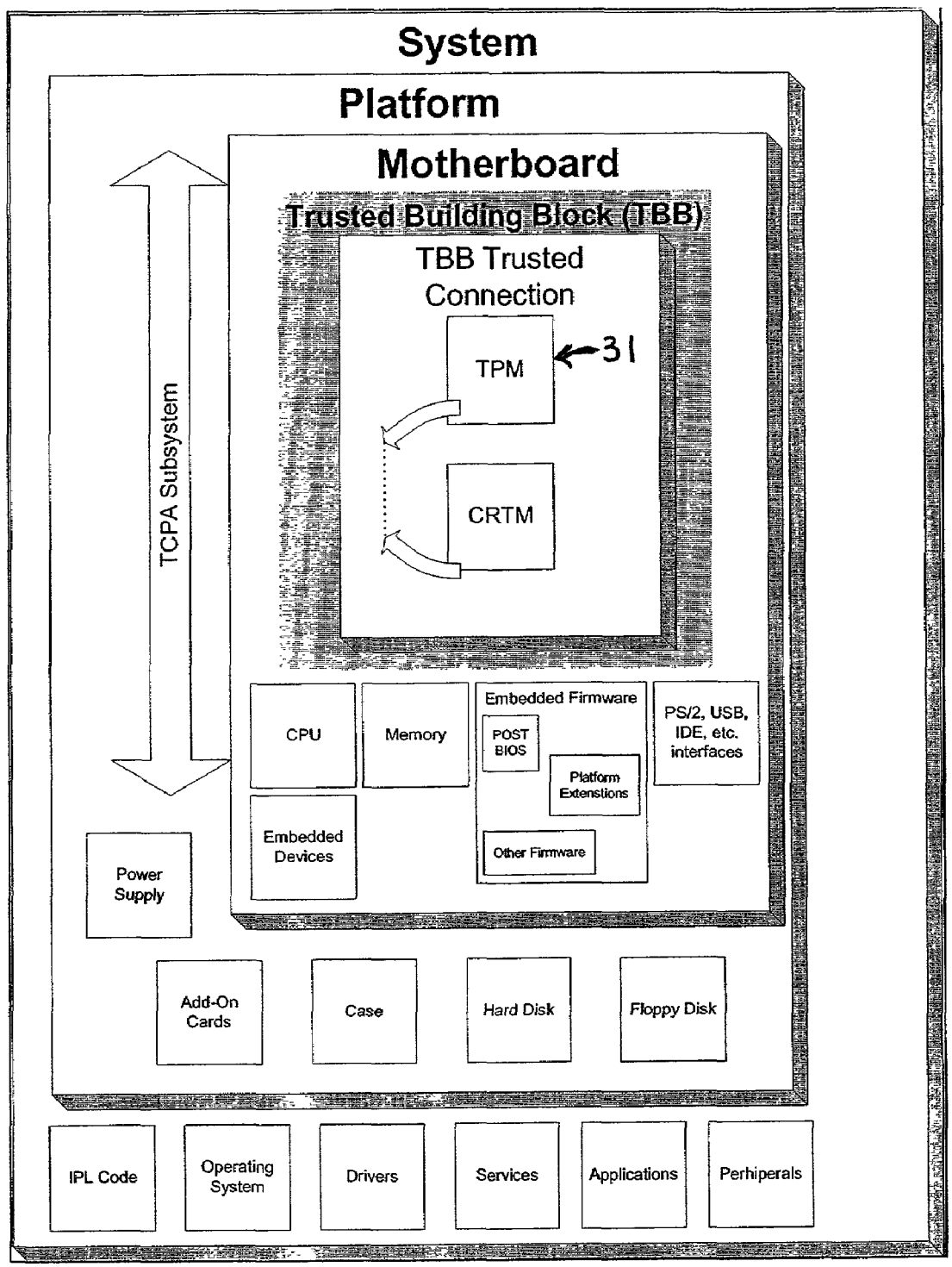
FIG. 3 is an illustration drawn from the TCPA PC Specific Implementation Specification to illustrate the presence of certain elements of the system of FIG. 2.

Turning now to FIGS. 2 and 3, a computer system is there shown and generally identified at 20. The system includes a display 21 and a keyboard 22 associated with the system 20. In accordance with this invention, the system is provided with a TPM indicated at 31 in FIG. 3.

Figure 4:
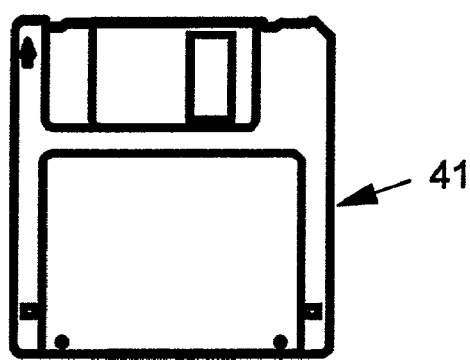
FIG. 4 is an schematic illustration of a computer readable medium on which is stored code effective on execution to produce the steps of FIG. 1.

FIG. 4 illustrates a diskette 41 as being one form of computer readable medium on which code is stored which is effective, on execution, to cause a computer system having appropriate capabilities to execute the steps of FIG. 1.

In the drawings and specifications there has been set forth a preferred embodiment of the invention and, although specific terms are used, the description thus given uses terminology in a generic and descriptive sense only and not for purposes of limitation.

What is claimed is:

1. A method comprising the steps of:
   initiating the operation of a computer system having trusted computing platform capabilities;
   executing code stored accessibly to the computer system to transition the computer system first to a state of presenting a secure virtual machine;
   said code, when executing on said computer system while in the secure virtual machine state, retrieving data stored in a platform configuration register and then locking the retrieved data against subsequent access by any virtual machine instantiation subsequently initiated;
   said code, when executing on said computer system while in an insecure state, responding to a user request for initiation of authentication of a file by transitioning the computer system to a secure machine state, announcing to the user entry into the secure machine state, and deriving from the locked data keys for authentication of the file.

2. A method according to claim 1 wherein the step of retrieving data stored in a platform configuration register comprises retrieving a passphrase selected by a user who will subsequently seek authentication of a file and a random data string necessary to enable use of a trusted platform module.

3. A method according to claim 1 wherein the step of announcing to a user entry into the secure machine state comprises displaying on a display associated with the computer system a distinctive display.

4. A method according to claim 1 wherein the step of announcing to a user entry into the secure machine state comprises selectively energizing indicators on a keyboard associated with the computer system.

5. Apparatus comprising:
   a computer system having a trusted platform module;
   memory associated with said computer system for storing code accessibly to said computer system;
   code stored in said memory and effective, on execution by said computer system, to cause said computer system on initiation of operation to transition first to a state presenting a secure virtual machine;
   said code, when executing on said computer system while in the secure virtual machine state, retrieving data stored in a platform configuration register and then locking the retrieved data against subsequent access by any virtual machine instantiation subsequently initiated;
   said code, when executing on said computer system while in an insecure state, responding to a user request for initiation of authentication of a file by transitioning the computer system to a secure machine state, announcing to the user entry into the secure machine state, and deriving from the locked data keys for authentication of the file.

6. Apparatus according to claim 5 wherein said code and said computer system, in retrieving data stored in a platform configuration register, retrieves a passphrase selected by a user who will subsequently seek authentication of a file and a random data string necessary to enable use of a trusted platform module.

7. Apparatus according to claim 5 wherein said code and said computer system, in announcing to a user entry into the secure machine state, displays on a display associated with the computer system a distinctive display.

8. Apparatus according to claim 5 wherein said code and said computer system, in announcing to a user entry into the secure machine state, selectively energizes indicators on a keyboard associated with the computer system.

9. Apparatus comprising:
   a computer readable medium, and
   code stored on said medium accessibly to a computer system having trusted computing platform capabilities and effective, when executing on said computer system, to cause the code and the computer system together to:
   initiate the operation of the computer system;
   transition the computer system first to a state of presenting a secure virtual machine;
   said code, when executing on said computer system while in the secure virtual machine state, retrieving data stored in a platform configuration register and then locking the retrieved data against subsequent access by any virtual machine instantiation subsequently initiated;
   said code, when executing on said computer system while in an insecure state, responding to a user request for initiation of authentication of a file by transitioning the computer system to a secure machine state, announcing to the user entry into the secure machine state, and deriving from the locked data keys for authentication of the file.

10. Apparatus according to claim 9 wherein the retrieving of data stored in a platform configuration register comprises retrieving a passphrase selected by a user who will subsequently seek authentication of a file and a random data string necessary to enable use of a trusted platform module.

11. A method according to claim 9 wherein the announcing to a user of entry into the secure machine state comprises displaying on a display associated with the computer system a distinctive display.

12. Apparatus according to claim 9 wherein the announcing to a user of entry into 2 the secure machine state comprises selectively energizing indicators on a keyboard 3 associated with the computer system.

* * * * *